(12) United States Patent
Chung et al.

(10) Patent No.: US 8,527,959 B2
(45) Date of Patent: Sep. 3, 2013

(54) BINARY PROGRAMMABLE METHOD FOR APPLICATION PERFORMANCE DATA COLLECTION

(75) Inventors: I-Hsin Chung, Yorktown Heights, NY (US); Kattamuri Ekanadham, Mohegan Lake, NY (US); David Joseph Klepacki, New Paltz, NY (US); Simone Sbaraglia, Mahopac, NY (US); Robert Edward Walkup, Ossining, NY (US); Hui-Fang Wen, Yorktown Heights, NY (US); Hao Yu, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 1420 days.

(21) Appl. No.: 11/952,922

(22) Filed: Dec. 7, 2007

(65) Prior Publication Data
US 2009/0150874 A1 Jun. 11, 2009

(51) Int. Cl.
*G06F 9/44* (2006.01)
(52) U.S. Cl.
USPC .......................................... 717/128; 717/158

(58) Field of Classification Search
USPC .................................. 717/124–133, 154–161
See application file for complete search history.

(56) References Cited

PUBLICATIONS

Gary Mullen-Schultz, "Blue Gene/L: Performance Analysis Tools", Jul. 2006, IBM.com/redbook, 154 pages.*
Schulz et al., "Scalable Dynamic Binary Instrumentation for Blue Gene/L", Dec. 2005, ACM SIGARCH, pp. 9-14.*
"Microsoft Computer Dictionary", 2002, 5th ed., Microsoft Press, p. 182.*

\* cited by examiner

*Primary Examiner* — Ted T Vo
(74) *Attorney, Agent, or Firm* — Michael J. Buchenhorner

(57) ABSTRACT

A method for application performance data collection includes steps or acts of: customizing a performance tool for collecting application performance data of an application; modifying the application by inserting the performance tool while the application does not need to be rebuilt from the source; executing the application; and collecting the application execution performance data such that only interesting data is collected. Customizing the performance tool proceeds by implementing at least one configurable tracing function that can be programmed by the user; compiling the function (s) into an object file; and inserting the object file into the performance tool using binary instrumentation.

19 Claims, 6 Drawing Sheets

Existing MPI profiling/tracing tool

Figure 1: Existing MPI profiling/tracing tool

Figure 2: Utility functions

Figure 3: Implementation Example – Programmable MPI profiling/tracing tool

BINARY PROGRAMMABLE METHOD FOR APPLICATION PERFORMANCE DATA COLLECTION

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of application performance data collection and more particularly relates to a programmable binary method for application performance data collection.

BACKGROUND OF THE INVENTION

Applications run on today's massively parallel supercomputers are often guided toward scalable performance on thousands of processors with performance analysis tools. However, conventional tools for parallel performance analysis have serious problems due to the large data volume. For example, tracing tools like Paraver collect a sequence of time-stamped events in a program. For MPI tracing, Paraver intercepts MPI calls and saves individual trace files during application execution. The individual files are then merged, and the merged trace file is displayed using a viewer, which has many display and analysis features. Due to the cost to collect, store and transfer the performance data, Paraver is best suited for parallel applications at a modest scale rather than large systems such as IBM's Blue Gene/L systems. This basic difficulty affects all tracing tools because at large processor counts the trace files become large and difficult to work with.

On the other hand, profiling tools like mpiP only collect timing summaries. mpiP collects cumulative information about MPI functions. Since it collects only cumulative information, the output size is very small compared to MPI tracing tools, and the execution time overhead is normally small. However, the detailed time history of communication events is not available with this tool. As shown in above examples, current tools either collect all the performance information resulting in a large overhead or collect summarized information but not enough details for analysis.

Conventional performance analysis tools usually record performance information that is pre-defined by the tool developers. The performance analysis tools usually collect all possible primitive performance metrics such as time and bytes. In addition to that, the tool developer also has to "imagine" derived performance metrics (e.g., bandwidth: bytes/seconds) based on those primitive performance metrics measured. This mechanism works well with a small scale of computations with limited number of processors. However, lack of flexibility makes the scalability a critical issue as the computation scale (e.g, number of processors) goes up.

The overhead of the information collection activities in a performance analysis tool can dominate the system resource usage (e.g., memory used for tracing). The transition (e.g., through the network) and the storage for the collected performance information is another challenge. These overheads can make the performance analysis tools impractical (e.g., too much memory space required for detailed tracing). Even if the system has sufficient resources to handle these issues, it will be difficult to analyze the extraordinarily large amount of performance information collected.

The work flow of a typical existing MPI tracing tool is generalized in FIG. 1. In this approach, each invocation of MPI functions by the application (1001) is replaced with a call to a routine in the MPI performance tool library, which intercepts the MPI function call and do some bookkeeping in a "trace buffer" that resides in the memory. Then the tracing tool uses PMPI interface to call the actual MPI library (1003). When the application execution finishes, the tracing library outputs (1002) performance/tracing data that satisfy certain pre-defined metrics (1005 and 1006). The tools following this framework lack flexibility and often scale poorly if collecting excessive amount of tracing data.

SUMMARY OF THE INVENTION

Briefly, according to an embodiment of the invention a method includes steps or acts of: customizing a performance tool for collecting application performance data of an application; modifying the application by inserting the performance tool (without rebuilding the application from the source); executing the application; and collecting the application execution performance data such that only interesting data is collected. Customizing the performance tool proceeds by implementing one or more of the configurable functions; compiling the functions into an object file; and inserting the object file into the performance tool using binary instrumentation.

The configurable functions include: a function deciding where an event should be recorded into an in-memory trace, a function deciding whether a process of a massively parallel program should write the in-memory trace to files; and a function helping to calculate user-defined performance metrics. In addition, the invention includes a set of utility functions that can be used to assist the implementation of at least one of the configurable functions.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
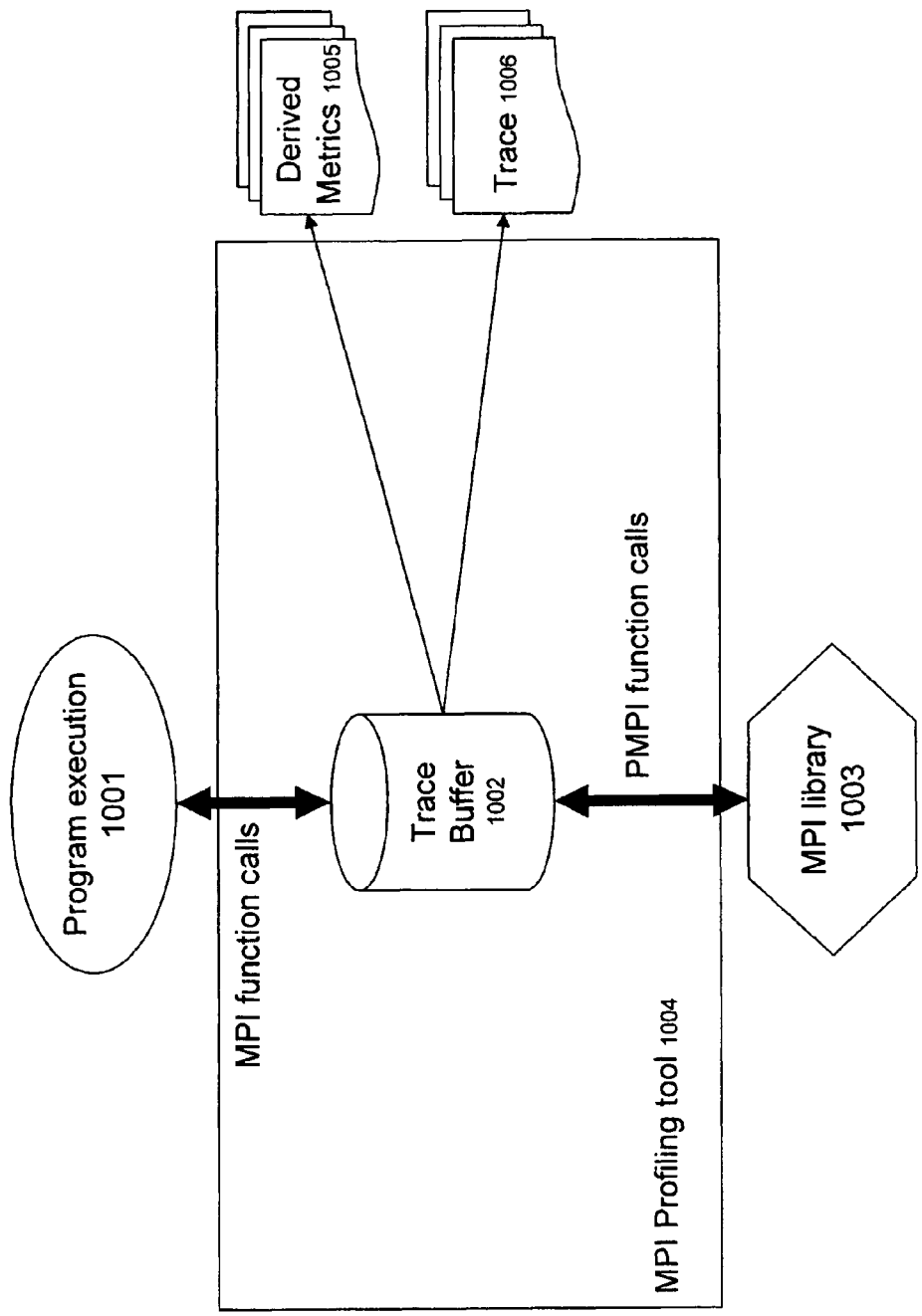
FIG. 1 shows an existing MPI profiler/tracing tool implementation, according to the known art.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

We describe a configurable method for application performance data collection that utilizes a binary patching mechanism. Unlike most existing performance tools where performance metrics are pre-defined, our design allows the flexibility to have user-defined performance metrics calculated during the collection process. With this invention, the user can dynamically configure the performance tool so only interesting performance data will be collected.

The configuration is compiled into binary form and then inserted into the user application using a binary instrumentation tool. By providing a configurable method for trace generation, some possible advantages of this invention are:

1) the volume of trace data to collect can be controlled therefore the cost or overhead to collect, transfer and store will be reduced significantly;

2) it helps to solve the scalability issue for performance analysis tool on large-scale systems like Blue Gene/L, the world's fastest supercomputing platform;

3) the dynamic profiling functionality can be used as a basis towards automatic performance tuning; and 4) it collects enough detailed performance information while maintaining reasonable overhead.

The programmable binary method we describe allows users to focus on interesting performance points. We select the MPI profiling/tracing component in the IBM High Performance Computing Toolkit as an example to illustrate how the design works and the prototype is implemented. By providing a flexible mechanism to control the events that are recorded, the tracing tool can remain useful for even very large-scale parallel applications.

Figure 2:
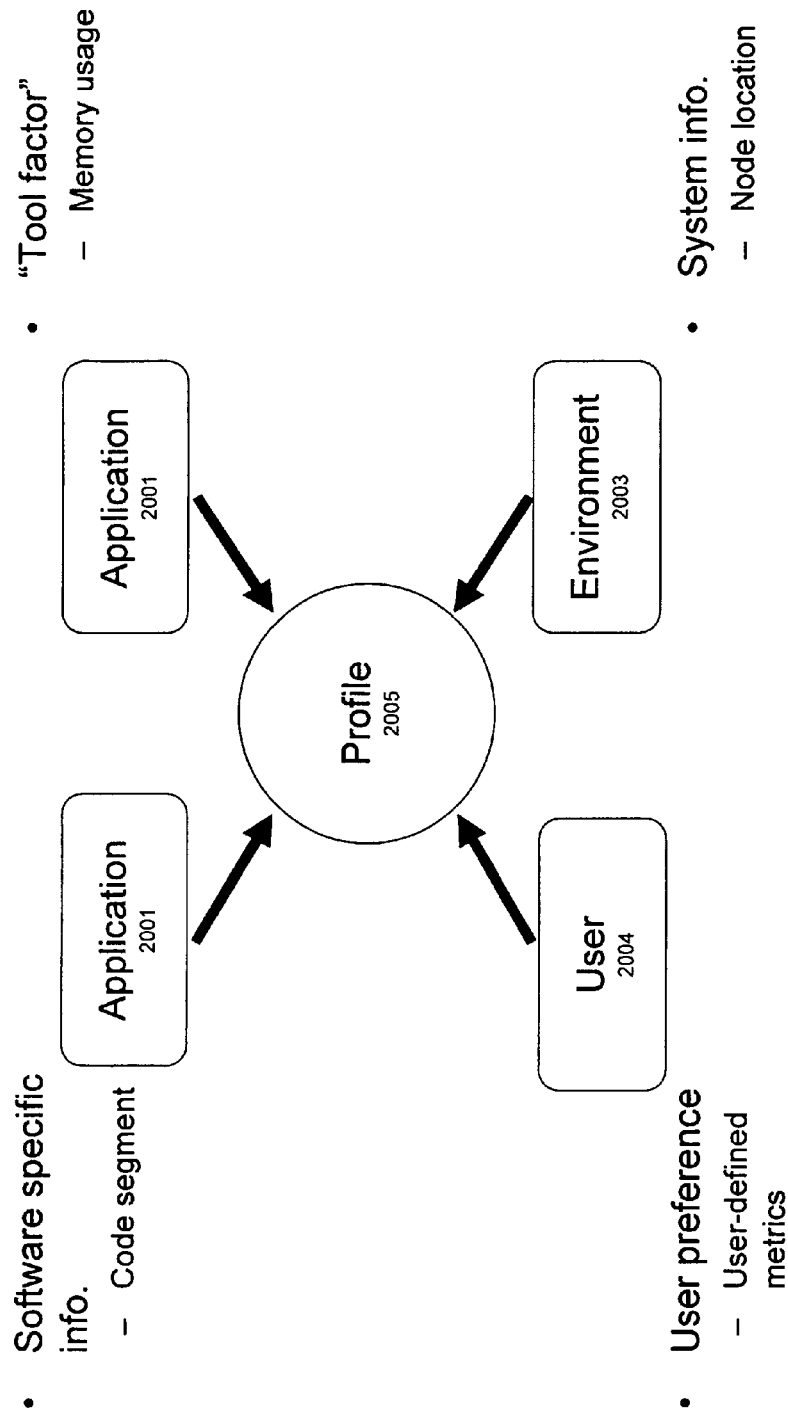
FIG. 2 shows the design for utility functions according to an embodiment of the present invention.

In our invention, we believe that a scalable or an efficient performance analysis tool should take the factors shown in FIG. 2 into consideration while collecting performance information. The four factors that affect the performance profiling/tracing tool (2005) are:

Application (2001). The useful performance information may only reside in a few code segments (e.g., certain loops). Therefore, the performance analysis tool should be able to access such program/software-specific information during performance tracing. Otherwise, collecting performance information from all code segments would just cause unnecessary overhead and waste the system resource.

Tool (2002). There are variables (such as available memory space for the trace buffer) from the performance analysis tool itself that can affect the performance information collection. On BG/L, if the performance analysis tool uses too much memory, application execution may fail because there are hard-limits of memory usage for each process.

Environment (2003). The performance analysis tool needs to take the system environment into consideration. On BG/L, tool users may be only interested in the performance information for certain MPI ranks. Or users may expect different MPI ranks to collect different performance information.

User (2004). Finally, tool users should be able to get involved in determining what performance information is of the most interest. For example, a derived performance metric can be a user-defined function that takes measured primitive performance metrics as its input. The capability would save the overhead for both the tool (to calculate derived metrics) and users (to analyze the collected performance information) compared to the postmortem data analysis. Exploration of above factors in the development process of a performance analysis tool would help the tool to achieve multiple goals of usability, efficiency, helpfulness, and finally, scalability. In particular, it would help to define the kind of information to be collected. By collecting only "useful" information, the overhead caused by the performance analysis tool can be reduced dramatically. And eventually, the overall performance analysis/tuning process will be improved significantly. According to the design considerations stated above, we developed a programmable MPI tracing library based on the existing IBM HPC Toolkit.

The primary reason for the lack of flexibility of typical performance tools is that the components of the tool library are all defined by the tool developer. To support a certain level of flexibility, based on interaction with application developers, performance analyzer, tool developers usually put in hard-coded mechanism (from tool users' point of view) inside the library routines. There are a few direct drawbacks of the approach.

First, the supported flexibility may never satisfy all users' requests. Secondly, while trying to support the "common" requirements, either the overhead of the tracing or accumulated data will grow and thereafter the tracing process does not scale. The method as described herein opens a few windows to tool users so that tool users can define, for the specific application, specific activities for the tracing/profiling process.

Figure 3:
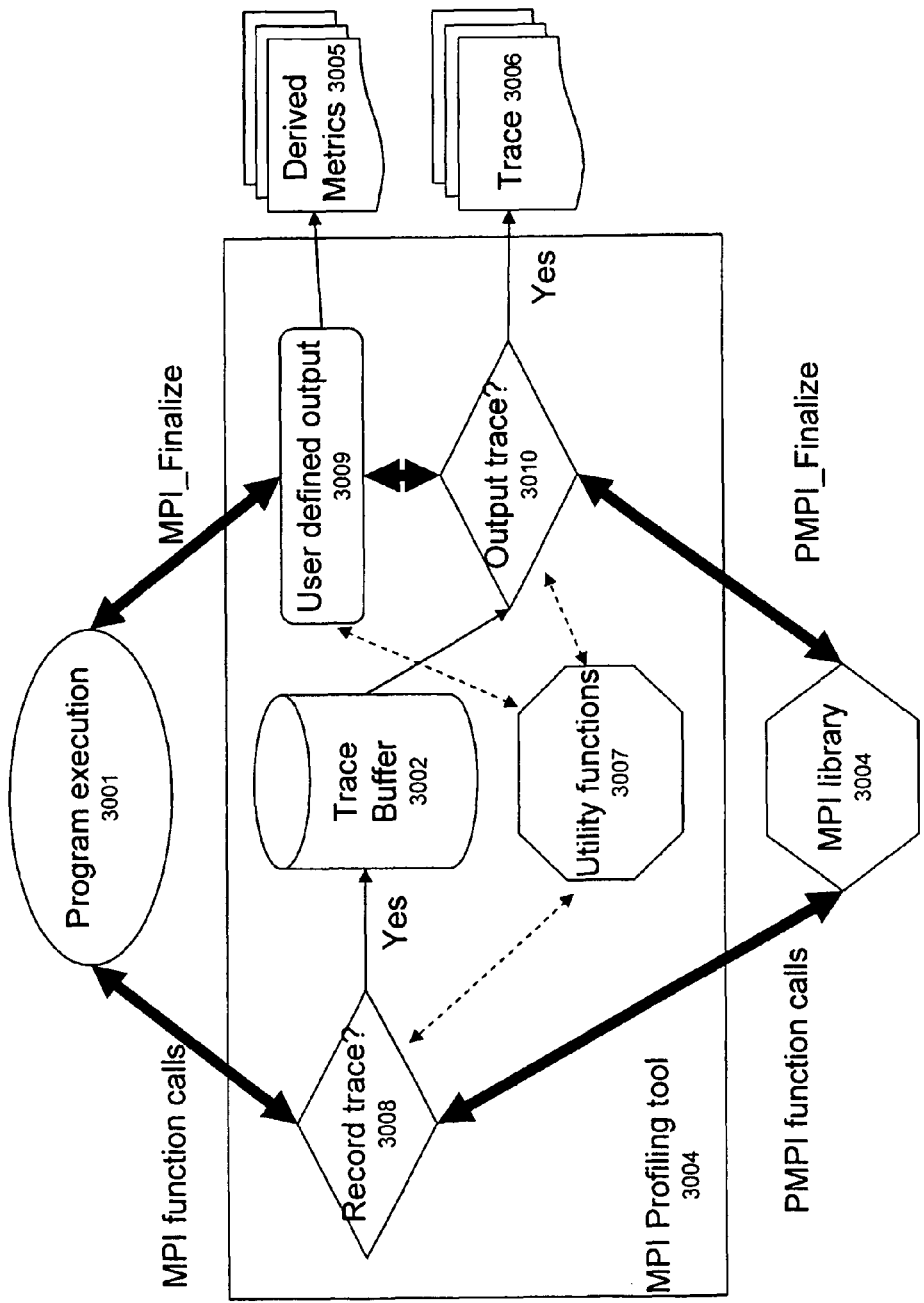
FIG. 3 shows an example of an MPI profiler/tracer implementation according to an embodiment of the present invention.

The design of the configurable approach according to an embodiment of the invention is illustrated in FIG. 3. As shown in the figure, in addition to maintaining compatibility with the MPI Tracer library in the IBM HPC Toolkit, we augment the previous approach with four components in the library. As indicated in FIG. 3, we separate the processes for MPI Finalize( ) and other MPI routines. Specifically, when a MPI routines (except MPI Finalize( )) is invoked by the application (3001), a function MT trace_event( ) is called to decide if the specific invocation instance needs to perform any tracing activity and save the trace data into the "trace buffer."

The function is implemented using either (1) binary instrumentation such as pSigma or (2) weak symbol to allow the library users to override the default implementation with their customized version (i.e., for beginning users, they can use default implementation without overwriting it). A weak symbol is a symbol definition in an object file or dynamic library that may be overrident by other symbol definitions. The functionality of MT_trace_event( ) corresponds to the component marked as "record trace?" (3008) in FIG. 3.

Figure 4:
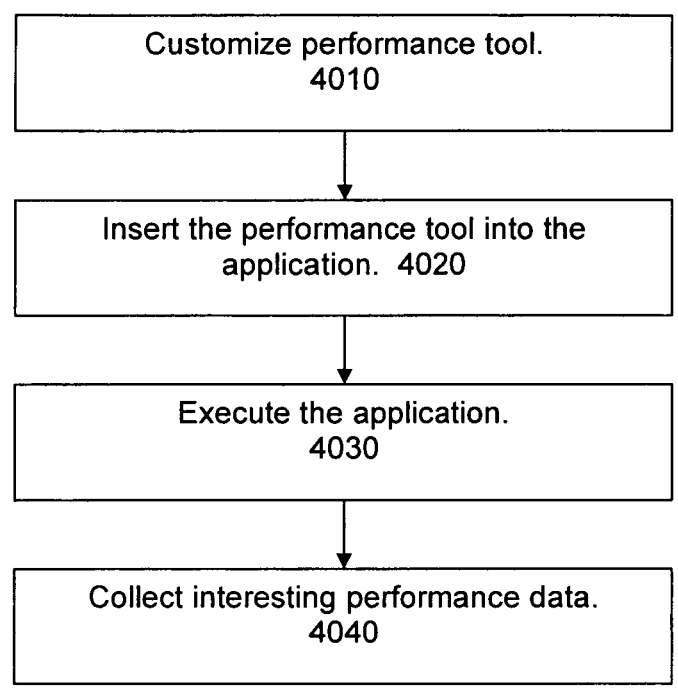
FIG. 4 is a high-level flow chart of a performance data collecting method according to an embodiment of the present invention.

Referring now to FIG. 4, there is shown a high-level flow chart of the process steps for the programmable binary method. First in step 4010, the performance tool is customized. In step 4020, the performance tool is inserted into the application. The application does not need to be rebuilt from the source, just modified. In step 4030, the application is executed. While the application is executing, in step 4040 dynamic performance data is collected. As stated earlier, one of the key aspects of the method is that only interesting data is collected.

Figure 5:
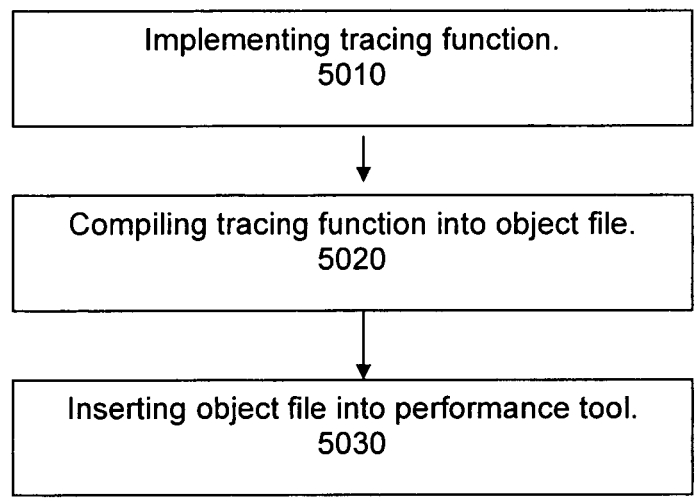
FIG. 5 is a low-level flow chart of the processing for customizing the performance tool, according to an embodiment of the present invention.

FIG. 5 is a low-level flow chart showing the processing for performing step 4010, customizing the performance tool. In step 5010, at least one tracing function is implemented so the tool is customized by the user. In step 5020, at least one function is compiled into an object file. Lastly, in step 5030, the object file is inserted into the performance tool using binary instrumentation.

With the simply-defined and straight-forward scope of the function, it gives users a very flexible way to define various filter functions. The filter functions can range from simply returning true (as the default implementation) to performing complicated tasks such as information selection, trace-target selection, detection of specific activities and patterns, and so on.

Particularly, as a relatively complicated example, this function can be used to build a pattern-recognition for MPI function call distribution. In other words, it can stop the performance tool recording MPI event if a repeated sequence of MPI calls is detected (start recording when a new sequence of MPI calls is detected). For the case when MPI Finalize( ) is called, two other configurable functions are invoked. First, MT_output_trace( ) takes the MPI rank as input, and returns whether to output its local profiling/tracing data to a file or not. In addition, MT_output_text( ) is designed to handle user-defined performance metrics. The functionalities of the two functions correspond to the "output trace?" (3010) and "user defined output" (3009) components in FIG. 3, respectively.

The above configurable functions provide flexible and powerful means for users to define many filtering heuristics or performing "intelligent" activities. Similarly, relatively simple implementations of the MT_trace_event( ) and MT_output_trace( ) functions can provide a great deal of selectivity in trace generation. For example, one could easily limit event records to a given time-window and/or a subset of MPI ranks, thus significantly reducing the volume of trace data. Besides supporting above three configurable functions, our library provides a number of utility functions (3007) to help the user easily customize the three configurable functions.

For example, we include utilities that return MPI message size, the number of hops a MPI message travels, the name of a MPI routine, caller information, etc. It also helps user to adjust tracing activity based on the dynamic usages of system resources and internal resources of the library (i.e., the trace buffer (3002) in FIG. 3). After the configurable functions are provided by the user, they are compiled into dynamic linking libraries and "inserted" into the binary executable of the application via binary instrumentation. When the application execution is done, only the desired performance data will be generated and collected.

This programmable design including binary instrumentation helps the user customize the performance tools (not just limited to the MPI profiling/tracing library 1003). It allows the user to configure the performance tool using the same high level C/Fortran programming language. The actual implementation is done in the binary level on the copy of original binary executable using binary instrumentation. Therefore the user does not need to recompile/relink the application. In addition, the original source code and application binary executable are not touched which is more error-proof. We believe this invention helps to manage the performance data collection with flexibility and scalability and can be used as a basis towards automatic performance tuning.

Now we discuss an exemplary usage scenario. In this example, we use MPI profiler/tracer component in the IBM High Performance Computing (HPC) toolkit as an implementation of the invention. The application of the invention is not limited to the MPI profiler/tracer and can be applied to other performance tools such as hardware counter library.

The prerequisites to this scenario are:
1. The machine is installed with MPI library and can run MPI applications.
2. The user has successfully build and run the MPI application on the machine.
   a. The application source code is compiled into binary object file(s) with debugging information (-g option for commonly used compilers).
   b. The object file(s) are linked with the MPI library into a binary executable.
   c. The binary executable can run on the machine successfully.
3. The IBM High Performance Computing toolkit (including the specific implementation of the invention) is installed on the machine.

Example usages of this embodiment are:
1. To program the MPI profiler/tracer
   a. Based on the user's need for MPI performance data, the user prepares source code for one or more of the following functions. Otherwise, the default implementations—trace every MPI function calls invoked at runtime—are used.
      MT_trace_event( )
      MT_output_trace( )
      MT_output_text( )
   b. The functions are compiled into an object file.
   c. The object file is inserted into the MPI profiler/tracer library using binary instrumentation.
2. To profile the MPI application: a) the user uses binary instrumentation to insert the MPI profiler/tracer into the application binary executable. This can be done through the visualization component in the IBM HPC toolkit or through the command line interface; or b) the application binary executable runs on the machine and generates MPI performance data.

Repeat above steps to refine MPI performance data collection.

The following alterations can be made to this exemplary embodiment without loss of functionality:
1. The order of steps 1 and 2 can be exchanged.
2. The instrumented application binary executable in step 2a and the instrumented MPI profiler/tracer library in step 1c can be reused for future binary instrumentation. In other words, the whole process allows instrumentation on the same MPI profiler/tracer library and application binary executable for more than one performance collection iteration. Recompiling/linking the application binary executable is not needed unless the application source code is changed by the user.

Figure 6:
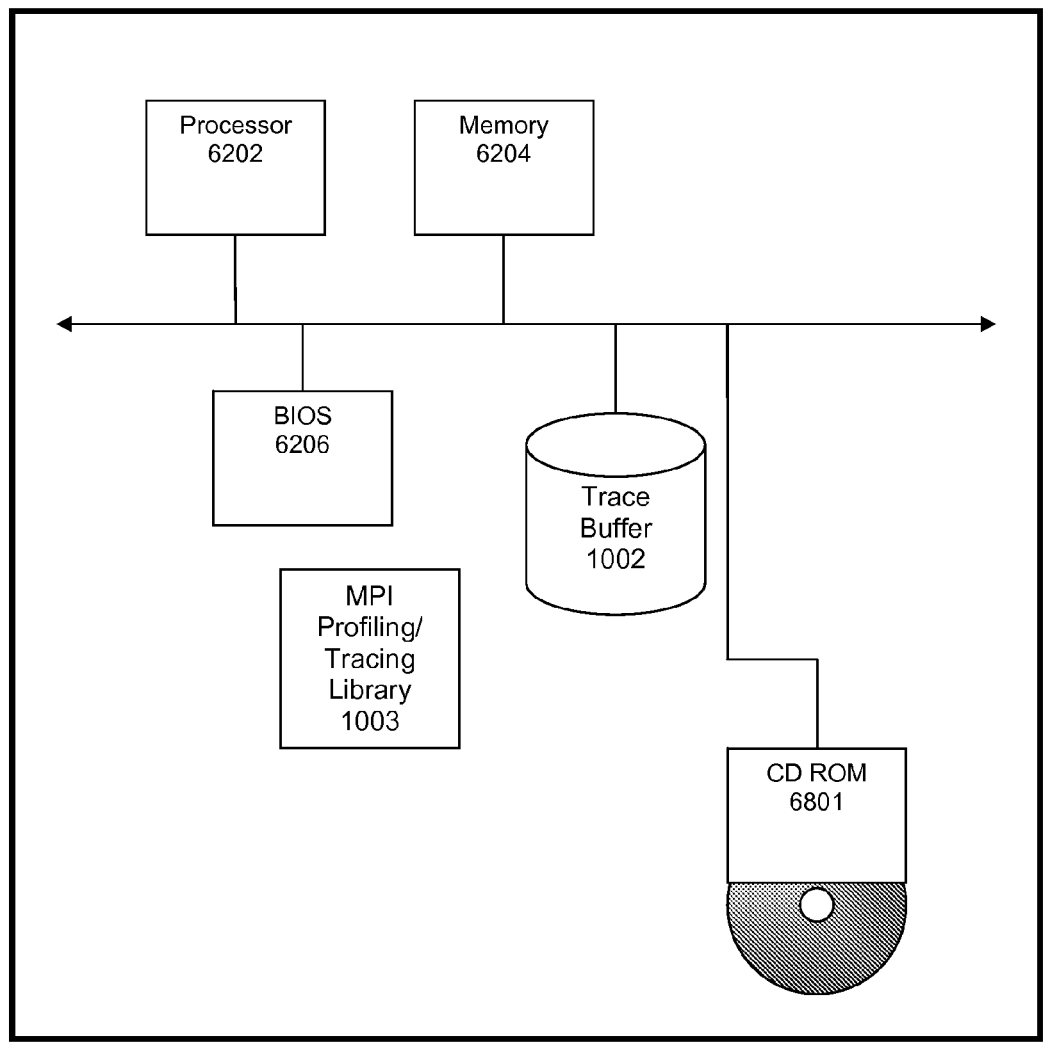
FIG. 6 is a high level block diagram showing an information processing system according to another embodiment of the invention.

Referring to FIG. 6, there is shown a simplified block diagram of an information handling system 6000 consistent with an embodiment of the present invention. For purposes of this invention, computer system 6000 may represent any type of computer, information processing system or other programmable electronic device, including a client computer, a server computer, a portable computer, an embedded controller, a personal digital assistant, and so on. The computer system 6000 may be a stand-alone device or networked into a larger system.

The system 6000 could include a number of operators and peripheral devices as shown, including a processor 6202, a memory 6204, and an input/output (I/O) subsystem 6206. The processor 6202 may be a general or special purpose microprocessor operating under control of computer program instructions executed from a memory. The processor may include a number of special purpose sub-processors, each sub-processor for executing particular portions of the computer program instructions. Each sub-processor may be a separate circuit able to operate substantially in parallel with the other sub-processors. Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips. The memory may be partitioned or otherwise mapped to reflect the boundaries of the various memory sub components.

The memory 6204 represents either a random-access memory or mass storage. It can be volatile or non-volatile. The system 6000 can also comprise a magnetic media mass storage device such as a hard disk drive.

The I/O subsystem 6206 may comprise various end user interfaces such as a display, a keyboards, and a mouse. The I/O subsystem 6206 may further comprise a connection to a network such as a local-area network (LAN) or wide-area network (WAN) such as the Internet. Processor and memory components are physically interconnected using a conventional bus architecture.

According to another embodiment of the invention, a computer readable medium, such as a CDROM 6801 can include program instructions for operating the programmable computer 6000 according to the invention. What has been shown and discussed is a highly-simplified depiction of a programmable computer apparatus. Those skilled in the art will appreciate that a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include ROMs, DVD-ROMs, and transmission-type media, such as digital and analog communication links, wired or wireless communications links using transmission forms, such as, for example, radio frequency and light wave transmissions. The signal bearing media make take the form of coded formats that are decoded for use in a particular data processing system.

Therefore, while there has been described what is presently considered to be the preferred embodiment, it will understood by those skilled in the art that other modifications can be made within the spirit of the invention. The above descriptions of embodiments are not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiments described above, but rather should be interpreted within the full meaning and scope of the appended claims.

We claim:

1. A method comprising steps of:
    generating a performance tool for collecting user-specified application performance data of an application, said performance tool comprising configurable functions compiled into a dynamic linking library;
    modifying the application to insert the performance tool into a binary executable of said application via binary instrumentation such that the application does not need to be rebuilt from a source;
    wherein implementation is done at a binary level on a copy of an original binary executable using the binary instrumentation, without requiring re-linking of the application;
    wherein original source code of the application and the original application binary executable are not modified;
    executing the application; and
    collecting dynamic performance data of the application during the execution of the application such that only interesting data is collected.

2. The method of claim 1 wherein the customizing step comprises steps of:
    implementing at least one configurable tracing function that can be programmed by the user;
    compiling the at least one configurable tracing function into an object file; and
    inserting the object file into the performance tool using binary instrumentation.

3. The method of claim 2 wherein the implementing step comprises steps of:
    implementing at least one tracing function selected from a group consisting of:
    a function deciding whether and where an event should be recorded into an in-memory trace, a function deciding whether a process of a massively parallel program should write the in-memory trace to files; and
    a function helping to calculate user-defined performance metrics;
    utilizing utility functions to assist the implementation of the at least one tracing function; and
    filtering the performance data for providing the user with an ability to focus on user-interested performance data when implementing the at least one tracing function.

4. The method of claim 2 wherein C/Fortran is used to implement at least one configurable tracing function.

5. The method of claim 3 wherein filtering the performance data comprises implementing filter functions ranging from a simple filter function for a default implementation to filter functions performing complicated tasks selected from a group consisting of: information selection, trace-target selection, detection of specific activities, and detection of patterns.

6. The method of claim 3 further comprising a step of building a time-ordered list of the tracing functions that are called.

7. The method of claim 5 wherein the detection of patterns comprises:
    stopping event recording when a repeated sequence of function calls is detected; and
    starting the event recording when a new sequence of function calls is detected.

8. The method of claim 1 further comprising a step of storing the collected dynamic performance data.

9. The method of claim 8 further comprising storing the collected dynamic performance data in a trace buffer.

10. The method of claim 1 wherein collecting the dynamic performance data comprises collecting the performance data from only selected code segments of the application rather than all code segments.

11. An information processing system comprising:
a data storage for storing performance data;
an input/output interface for communicating performance data results to a user;
a profiling/tracing library;
a memory having program code stored therein; and
a processor operatively connected to said memory for carrying out instructions in accordance with said stored program code; wherein said program code, when executed by said processor, causes said processor to:
generate a performance tool for collecting user-specified application performance data of an application, said performance tool comprising configurable functions compiled into a dynamic linking library;
modify the application to insert the performance tool into a binary executable of said application via binary instrumentation such that the application does not need to be rebuilt from a source;
wherein implementation is done at a binary level on a copy of an original binary executable using the binary instrumentation, without requiring re-linking of the application;
wherein original source code of the application and the original binary executable are not modified;
execute the application; and
collect dynamic performance data of the application during the execution of the application such that only interesting data is collected.

12. The information processing system of claim 11 wherein the data storage is a trace buffer.

13. The information processing system of claim 11 wherein the instructions further cause the processor to:
implement at least one configurable tracing function that can be programmed by the user;
compile the at least one configurable tracing function into an object file; and
insert the object file into the performance tool using binary instrumentation.

14. The information processing system of claim 13 wherein the implementing step comprises steps of:
implementing at least one tracing function selected from a group consisting of:
a function deciding whether and where an event should be recorded into an in-memory trace, a function deciding whether a process of a massively parallel program should write the in-memory trace to files; and a function helping to calculate user-defined performance metrics;
utilizing utility functions to assist the implementation of the at least one tracing function; and
filtering the performance data for providing the user with an ability to focus on user-interested performance data when implementing the at least one tracing function.

15. The information processing system of claim 14 wherein filtering the performance data comprises implementing filter functions ranging from a simple filter function for a default implementation to filter functions performing complicated tasks selected from a group consisting of: information selection, trace-target selection, detection of specific activities, and detection of patterns.

16. The information processing system of claim 15 wherein the detection of patterns comprises:
stopping event recording when a repeated sequence of function calls is detected; and
starting the event recording when a new sequence of function calls is detected.

17. A computer program product embodied on a non-transitory computer readable medium and comprising code that, when executed, causes a computer to perform the following:
generate a performance tool for collecting user-specified application performance data of an application, said performance tool comprising configurable functions compiled into a dynamic linking library;
modify the application to insert the performance tool into a binary executable of said application via binary instrumentation such that the application does not need to be rebuilt from a source;
wherein implementation is done at a binary level on a copy of an original binary executable using the binary instrumentation, without requiring re-linking of the application;
wherein original source code of the application and the original application binary executable are not modified;
execute the application; and
collect dynamic performance data of the application during the execution of the application such that only interesting data is collected.

18. The computer program product of claim 17 wherein the code further causes the computer to:
implement at least one configurable tracing function that can be programmed by the user;
compile the at least one configurable tracing function into an object file; and
insert the object file into the performance tool using binary instrumentation.

19. A system for obtaining services comprising:
a memory having program code stored therein;
a processor operatively connected to said memory for carrying out instructions in accordance with said stored program code; wherein said program code, when executed by said processor, causes said processor to:
generate a performance tool for collecting user-specified application performance data of an application, said performance tool comprising configurable functions compiled into a dynamic linking library;
modify the application to insert the performance tool into a binary executable of said application via binary instrumentation such that the application does not need to be rebuilt from a source;
wherein implementation is done at a binary level on a copy of an original binary executable using the binary instrumentation, without requiring re-linking of the application;
wherein original source code of the application and the original application binary executable are not modified;
execute the application;
collect dynamic performance data of the application during the execution of the application such that only interesting data is collected; and
present the collected performance data to a second user.

* * * * *